(12) United States Patent
Landais et al.

(10) Patent No.: US 10,506,465 B2
(45) Date of Patent: Dec. 10, 2019

(54) OVERLOAD CONTROL IN A PACKET MOBILE COMMUNICATION SYSTEM

(75) Inventors: Bruno Landais, Lannion (FR); Laurent Thiebaut, Nozay (FR)

(73) Assignee: Alcatel Lucent, Nozay (FR)

( * ) Notice: Subject to any disclaimer, the term of this patent is extended or adjusted under 35 U.S.C. 154(b) by 0 days.

(21) Appl. No.: 13/696,292

(22) PCT Filed: May 2, 2011

(86) PCT No.: PCT/EP2011/056977
§ 371 (c)(1),
(2), (4) Date: Jan. 25, 2013

(87) PCT Pub. No.: WO2011/138288
PCT Pub. Date: Nov. 10, 2011

(65) Prior Publication Data
US 2013/0128744 A1 May 23, 2013

(30) Foreign Application Priority Data
May 3, 2010 (EP) .................................... 10290236

(51) Int. Cl.
*H04W 28/02* (2009.01)
(52) U.S. Cl.
CPC ....... *H04W 28/0221* (2013.01); *H04W 28/02* (2013.01)
(58) Field of Classification Search
CPC .................................................... H04W 28/02
See application file for complete search history.

(56) References Cited

U.S. PATENT DOCUMENTS

| 6,532,214 B1* | 3/2003 | Rumsewicz ............ H04M 3/36 370/229 |
| 7,301,905 B1* | 11/2007 | Tontiruttananon ...... H04L 47/10 370/232 |
| 8,060,121 B1* | 11/2011 | Sun ........................ H04W 4/00 370/310.2 |
| 2004/0185867 A1 | 9/2004 | Wassew et al. |
| 2005/0282572 A1* | 12/2005 | Wigard et al. ................ 455/522 |
| 2010/0124191 A1* | 5/2010 | Vos et al. ...................... 370/328 |
| 2010/0124223 A1* | 5/2010 | Gibbs ................... H04W 28/06 370/389 |

(Continued)

FOREIGN PATENT DOCUMENTS

| CN | 1355999 A | 6/2002 |
| EP | 1 968 281 A1 | 9/2008 |

(Continued)

OTHER PUBLICATIONS

Koodli et al. U.S. Appl. No. 61/257,712.*
(Continued)

*Primary Examiner* — Mansour Oveissi
*Assistant Examiner* — David M Oveissi
(74) *Attorney, Agent, or Firm* — Fay Sharpe LLP

(57) ABSTRACT

In an embodiment, there is provided a method for overload control in a packet mobile communication system, said method comprising a step of:
in case of overload, throttling downlink traffic received for mobile terminals in idle mode when this traffic belongs to a mobile terminal or to a mobile terminal connection declared as candidate for throttling.

34 Claims, 3 Drawing Sheets

(56) References Cited

U.S. PATENT DOCUMENTS

| | | | | |
|---|---|---|---|---|
| 2010/0146117 | A1* | 6/2010 | Hoeksel | H04W 4/70 709/225 |
| 2010/0220680 | A1* | 9/2010 | Ramankutty et al. | 370/329 |
| 2010/0281157 | A1* | 11/2010 | Ramankutty | H04W 24/08 709/224 |
| 2011/0106946 | A1* | 5/2011 | Bao | H04L 65/40 709/225 |
| 2011/0151924 | A1* | 6/2011 | Miller | H04W 48/18 455/552.1 |
| 2013/0176975 | A1* | 7/2013 | Turanyi | H04W 28/16 370/329 |

FOREIGN PATENT DOCUMENTS

| | | |
|---|---|---|
| EP | 2053871 A1 | 4/2009 |
| JP | 2003-502927 A | 1/2003 |
| JP | 2004-534460 A | 11/2004 |
| WO | 2000/78061 A1 | 12/2000 |
| WO | 2003/003753 A2 | 1/2003 |
| WO | WO 2006/037378 A1 | 4/2006 |
| WO | WO 2009/096833 A1 | 8/2009 |

OTHER PUBLICATIONS

ETSI TS 129 274 V8. 1. 1 (Apr. 2009) 3GPP TS 29.274 Version 8.1.1 Release 8.*

LTE, "3$^{rd}$ Generation Partnership Project; Technical Specification Group Services and System Aspects; General Packet Radio Service (GPRS) enhancements for Evolved Universal Terrestrial Radio Access Network (E-UTRAN) access (Release 9)," 3GPP TS 23.401 V9.4.0, pp. 1-258, XP014046444, Mar. 1, 2010.

International Search Report for PCT/EP2011/056977 dated May 31, 2011.

English Bibliography for Japanese Patent Application No. JP2003502927A, published on Jan. 21, 2003, printed from Thomson Innovation on Jan. 6, 2015, 3 pp.

English Bibliography for Japanese Patent Application No. JP2004534460A, published on Nov. 11, 2004, printed from Thomson Innovation on Jan. 6, 2015, 4 pp.

PCT Pat. App. No. PCT/EP2011/056977, Written Opinion of the International Searching Authority, dated May 31, 2011, 6 pp.

European Pat. App. No. 10290236.8, Extended European Search Report, dated Sep. 14, 2010, 6 pp.

TD S2-101357; 3GPP TSG SA WG2 Meeting #78, Congestion Management in GPRS/EPC Core Network, Feb. 22-26, 2010, San Francisco, 3 pp.

English Bibliography for Chinese Patent Application Publication No. CN1355999A, published Jun. 26, 2002, printed from Thomson Innovation on May 20, 2016, 4 pp.

TD S2-102488, NIMTC—MME/SGSN overload control by DL MTC traffic throttling, 3GPP TSG SA WG2 Meeting #79, May 10-14, 2010, Kyoto, Japan, 3 pp.

3GPP TS 23.401 V9.0.0 (Mar. 2009); Technical Specification Group Services and System Aspects; General Packet Radio Service (GPRS) enhancements for Evolved Universal Terrestrial Radio Access Network (E-UTRAN) access (Release 9), 225 pp.

* cited by examiner

FIG_1
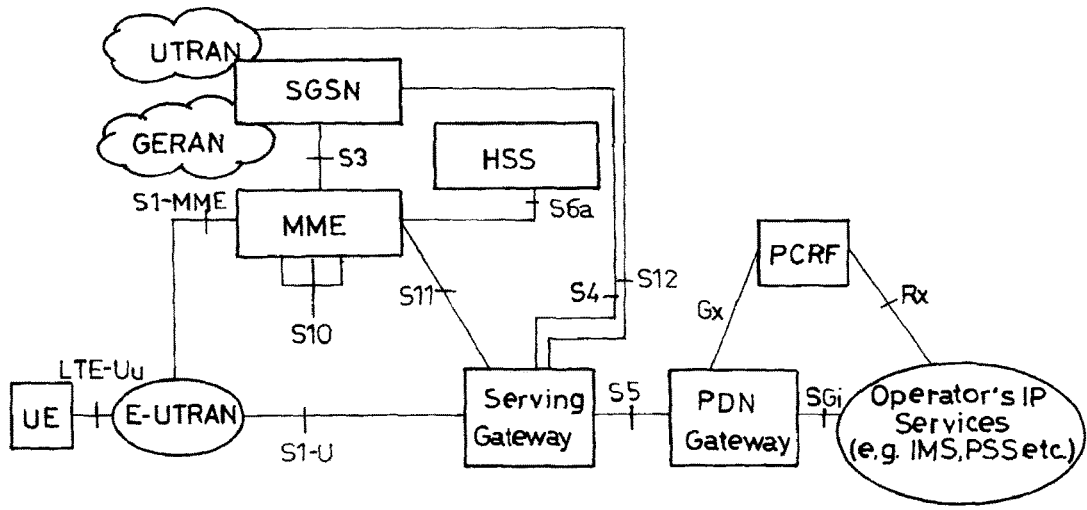
FIG_2
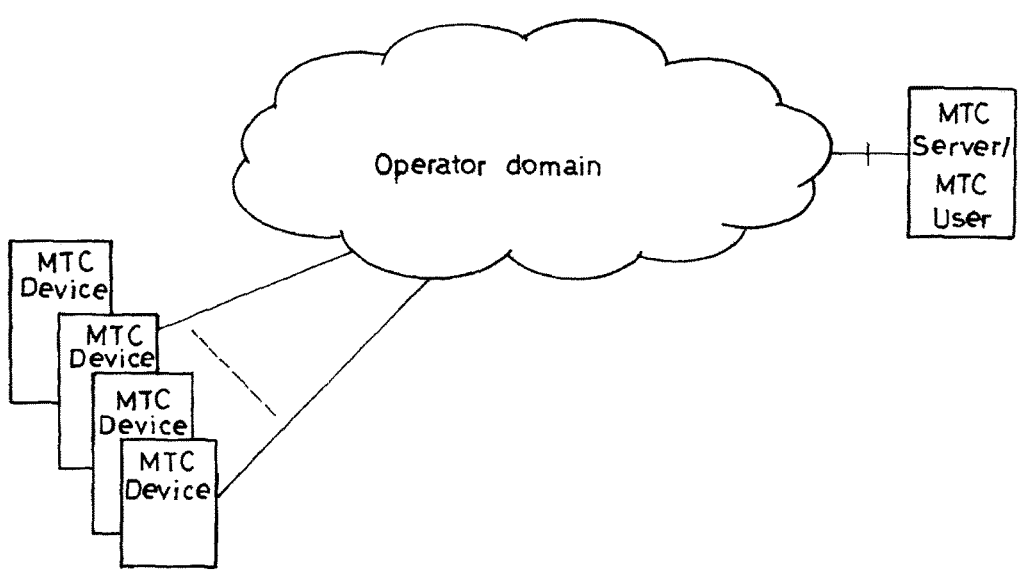

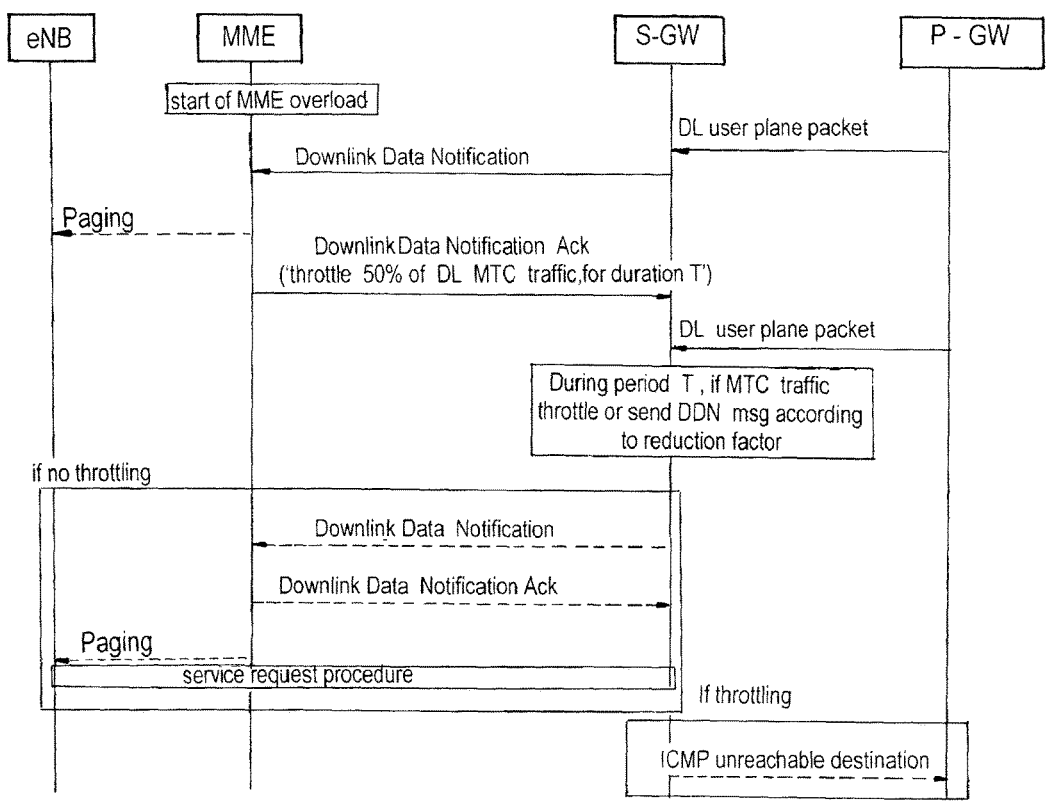

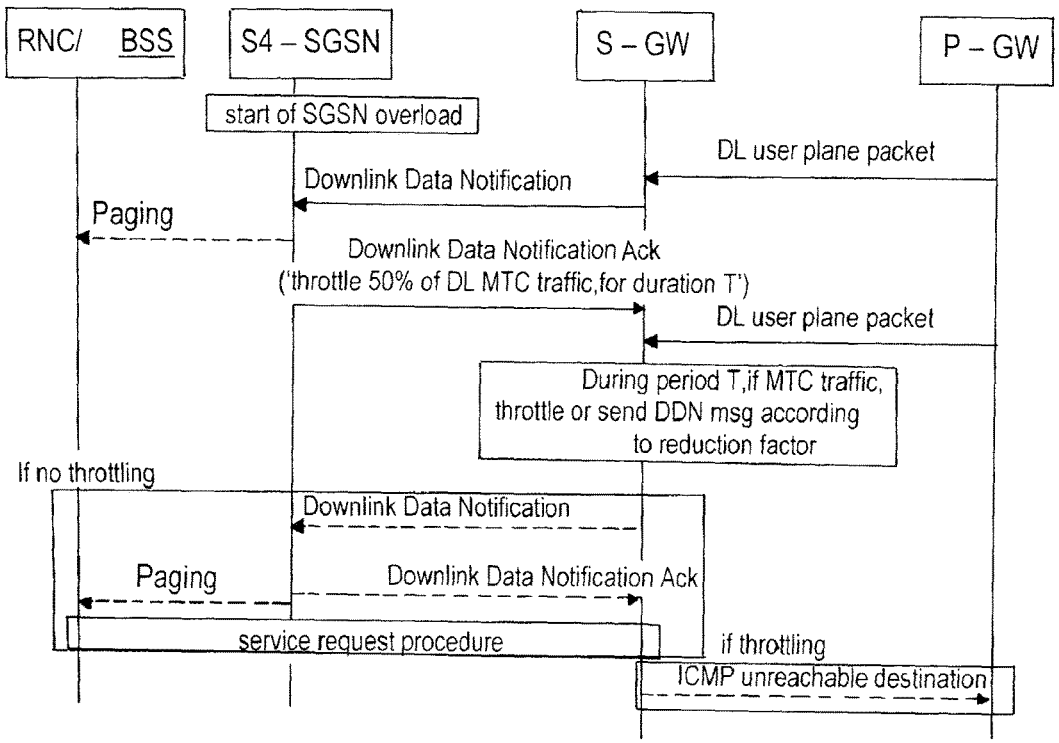
FIG_4
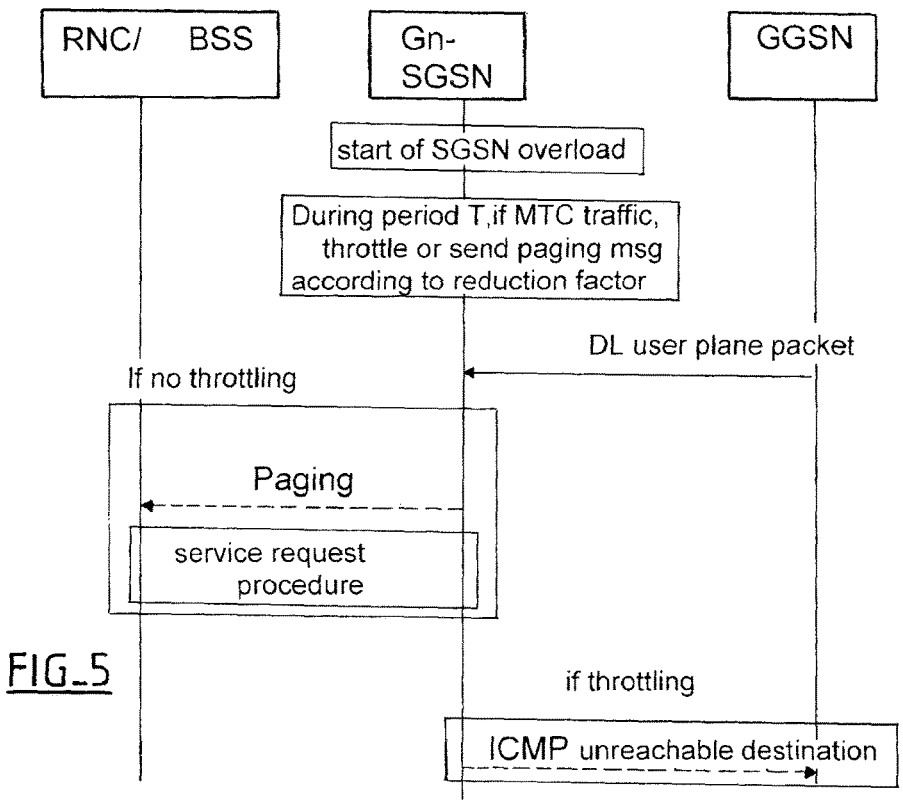
FIG_5

OVERLOAD CONTROL IN A PACKET MOBILE COMMUNICATION SYSTEM

CROSS-REFERENCE TO RELATED APPLICATIONS

This application is a U.S. National filing of PCT/EP2011/056977 and is based on European Patent Application No. 10290236.8 filed May 3, 2010, the disclosure of which is hereby incorporated by reference thereto in its entirety, and the priority of which is hereby claimed.

FIELD OF THE INVENTION

The present invention generally relates to mobile communication networks and systems.

BACKGROUND

Detailed descriptions of mobile communication networks and systems can be found in the literature, such as in particular Technical Specifications published by standardisation bodies such as for example 3GPP ($3^{rd}$ Generation Partnership Project).

In such systems, a mobile terminal or User Equipment (UE) has access to mobile services (such as in particular IP-based mobile services) via an Access Network (such as in particular packet-based Access Network) comprising a Radio Access Network (RAN) and a Core Network (CN).

Examples of 3GPP-based mobile communication systems include 2G GSM/GPRS, 3G UMTS, LTE also known as EPS (Evolved Packet System). Examples of Radio Access Network (RAN) include GERAN (for 2G GSM/GPRS), UTRAN (for 3G UMTS), E-UTRAN (for LTE). Examples of packet Core Network include GPRS Core (for 2G or 3G) and Evolved Packet Core EPC (for 2G, 3G UTRAN and LTE).

For example, EPS architecture is recalled in FIG. 1, taken from 3GPP TS 23.401. Within EPS, EPC may be accessed via E-UTRAN or via UTRAN/GERAN. EPC comprises entities such as MME (Mobility Management Entity), SGSN (Serving GPRS Support Node) supporting an S4 interface to a SGW and thus called S4-SGSN, SGW (Serving Gateway) and PGW (Packet Data Network PDN Gateway). MME interfaces with E-UTRAN in the control plane via S1-MME interface. S4-SGSN interfaces with UTRAN/GERAN in the control plane via the Iu/Gb interface respectively. SGW interfaces with MME/S4-SGSN in the control plane via S11/S4 interface respectively. SGW interfaces with E-UTRAN in the user plane via S1-U interface. SGW interfaces with UTRAN in the user plane via S12 interface. SGW interfaces with PGW in the user plane via S5/S8 interface.

SUMMARY

In such systems, a problem is that a number of mobile terminals or applications may simultaneously require communication network resources, which may induce a congestion or overflow of network resources, which may have serious consequences as the system may no longer be able to work properly. In particular, in a system such as EPS for example, Core Network entities such as MME/S4-SGSN, in charge of a number of functions related to communication network resources control, may become congested or overloaded.

This problem is becoming increasingly important in particular with the introduction in mobile networks of Machine to Machine (M2M) communication, also called Machine Type Communication MTC, for example as currently specified by standardization bodies such as 3GPP. As illustrated in FIG. 2 taken from 3GPP TS 22.368, an UE equipped for Machine Type Communication, also called MTC Device, communicates through a mobile network (operator domain) with MTC Server(s) and/or other MTC Device(s).

With the introduction in mobile networks of M2M or MTC type of applications, there is the risk that a huge number of terminals or MTC Devices or MTC applications simultaneously require communication network resources, thus significantly increasing the risk of congestion or overload.

There is a need to provide overload control in such systems, particularly (though not exclusively) for M2M communication.

These and other objects are achieved, in one aspect, in an embodiment, by a method for overload control in a packet mobile communication system, said method comprising a step of:

in case of overload, throttling downlink traffic received for mobile terminals in idle mode when this traffic belongs to a mobile terminal or to a mobile terminal connection declared as candidate for throttling.

These and other objects are achieved in other aspects, by entities such as in particular Core Network entities of a packet mobile communication system, configured to carry out such method. Such entities may include in particular MME/S4-SGSN and SGW for EPS, or SGSN (also called Gn-SGSN as they support the Gn interface with a GGSN) and GGSN for GPRS/UMTS.

BRIEF DESCRIPTION OF THE DRAWINGS

Some embodiments of apparatus and/or methods in accordance with embodiments of the present invention are now described, by way of example only, and with reference to the accompanying drawings, in which:

FIG. 1 is intended to illustrate EPS architecture,

FIG. 2 is intended to illustrate introduction of MTC in mobile networks,

FIG. 3 is intended to illustrate DL MTC traffic reduction according to an embodiment of the present invention, for the case of EPS and E-UTRAN access to EPC, FIG. 4 is intended to illustrate DL MTC traffic reduction according to an embodiment of the present invention, for the case of EPS and UTRAN/GERAN access to EPC, FIG. 5 is intended to illustrate DL MTC traffic reduction according to an embodiment of the present invention, for the case of GPRS/UMTS.

DESCRIPTION OF EMBODIMENTS

In embodiments of the present invention described hereinafter, MTC will more particularly be considered, as an example. However embodiments of the present invention are not limited to such example.

In embodiments of the present invention described hereinafter, the case of EPS will mainly be considered. However embodiments of the present invention are not limited to such example. For example, embodiments of the present invention also apply to GPRS/UMTS.

As indicated above, one problem, with the introduction in mobile networks of applications such as M2M or MTC, is the risk that a huge number of mobile terminals (referred to as MTC Device) or MTC applications simultaneously require communication network resources, thus significantly increasing the risk of congestion or overload.

In particular, one problem is the risk that a huge number of mobile terminals in idle mode simultaneously need to become active again for DownLink (DL) traffic, in which case Core Network entities such as MME or S4-SGSN (in charge of a number of functions, including functions related to the network triggered service request procedure to be performed in such case for transition of the mobile EPS Connection Management state from ECM-Idle to ECM-Connected) may become overloaded.

The network triggered service request procedure in particular includes the following steps:
  Upon receipt of DL traffic towards an UE in idle mode, SGW sends a Downlink Data Notification message to MME/S4-SGSN,
  MME/S4-SGSN responds to SGW with a Downlink Data Notification Ack message,
  MME/S4-SGSN sends a Paging message to the eNodeB(s)/RNC(s)/BSS(s) belonging to the Tracking Area(s)/Routing Area(s) in which the UE is registered.
  An UE triggered service request procedure may then be performed. During this UE triggered service request, many signaling messages need to be exchanged back and forth between the mobile and the MME/S4-SGSN.
  All these steps consume signaling capacity in the MME/S4-SGSN and in case of congestion of an MME/S4-SGSN, there is the need to avoid those steps when the DL traffic that triggers those steps corresponds to low priority traffic such as most of the M2M related traffic.

A possible approach for solving the above-mentioned problem could be as follows.

Upon receipt of DL MTC traffic towards a MTC device in idle mode, the SGW sends a Downlink Data Notification message to the MME/S4-SGSN, for this MTC Device. An MME/S4-SGSN under overload conditions might decide to reject the request from the SGW instead of triggering a network-initiated service request towards the UE, based on the knowledge that this is an MTC PDN connection.

However, such approach would not allow to decrease the signaling traffic on the S11 and S4 interfaces (i.e. between SGW and respectively MME and S4-SGSN) induced by MTC traffic. This would still require the MME/S4-SGSN (under overload) to process and answer to Downlink Data Notification messages received for MTC traffic, thus still implying processing load on the MME/S4-SGSN. Thus, an MME or S4-SGSN overload that would result from a peak of MTC traffic would affect all the traffic of the operator. This is exactly what operators do not want as they want to be able, at peak hours or when a MME/S4-SGSN starts experiencing congestion, to throttle or to forbid only MTC traffic, thus providing a kind of precedence to regular traffic (not throttled or forbidden) with regard to MTC traffic (throttled or forbidden).

Thus, there is a need for a different approach that would enable to avoid part or all of such drawbacks. More generally there is a need to improve congestion or overload control in mobile networks.

Embodiments of the present invention described hereinafter in particular address such needs.

In an embodiment, the EPC and GPRS Core network (MME and SGSN) when in overload should be allowed to reduce the DL signalling load generated by Machine to Machine applications, or even outside overload conditions in periods of time during which the network is not prepared to accept increase of traffic for MTC communications (e.g. during busy hours).

In an embodiment, an MME or SGSN starting to experience overload should be able to trigger partial or complete throttling of the signalling traffic generated by MTC devices/applications while still allowing normal operations for the existing non-MTC traffic (e.g. voice, data, signalling).

In an embodiment, an MME or S4-SGSN starting to experience overload should be able to request the SGWs to throttle DL MTC traffic received for devices in idle mode, i.e. traffic for which the SGW would normally send a Downlink Data Notification message to the MME/S4-SGSN to trigger a network-initiated service request procedure.

Throttling of the DL MTC signalling traffic should take place at the closest point to the source of the traffic.

In an embodiment, –DL MTC traffic received for MTC devices in ECM-Idle state or PMM-Idle mode is throttled, i.e. traffic for which the SGW would normally send a Downlink Data Notification message to the MME/S4-SGSN to trigger a network-initiated service request procedure.

FIG. 3 is intended to illustrate DL MTC traffic reduction according to an embodiment of the present invention, for the case of EPS and E-UTRAN access to EPC.

An MME starting to experience overload (i.e. whose load exceeds a threshold to start MTC traffic throttling) may reduce its load by requesting the SGW to throttle DL MTC traffic for MTC devices in idle mode according to a throttling factor (%) and for a throttling delay specified in the request. Such request may be sent e.g. within the Downlink Data Notification Ack message.

During that throttling delay, the SGW drops DL packets received on an MTC PDN connection served by that MME and without an S1 bearer, in proportion to the throttling factor, and sends a Downlink Data Notification message to the MME only for the non throttled DL packets.

The SGW resumes normal operations at the expiry of the throttling delay. The last received value of the MTC throttling factor and throttling delay supersedes any previous values received from that MME. The reception of an "MTC throttling delay" restarts the SGW timer associated with that MME.

When dropping a DL IP packets, the SGW may send an ICMP packet (e.g. ICMP "destination un-reachable") in the UL data flow of the PDN connection that should tell the source of the DL IP packet having been dropped that there is no use in repeating the packet.

The MME may signal to the SGW, when setting up a PDN connection, whether the PDN connection is for MTC traffic or not.

FIG. 4 is intended to illustrate DL MTC traffic reduction according to an embodiment of the present invention, for the case of EPS and UTRAN/GERAN access to EPC.

FIG. 4 is similar to FIG. 3, MME being replaced by S4-SGN, and eNB being replaced by RNC/BSS.

FIG. 5 is intended to illustrate DL MTC traffic reduction according to an embodiment of the present invention, for the case of GPRS/UMTS.

In FIG. 5, an SGSN, also called Gn-SGSN, starting to experience overload (i.e. whose load exceeds a threshold to start MTC traffic throttling) may reduce its load by throttling DL MTC traffic for MTC devices in idle mode according to a throttling factor (%) and for a throttling delay.

During that throttling delay, the Gn-SGSN drops DL packets received on an MTC PDP context served by that Gn-SGSN and without a radio and Iu bearer, in proportion to the throttling factor, and sends a Paging message to the RNC/BSS only for the non throttled DL packets.

The Gn-SGSN resumes normal operations at the expiry of the throttling delay. The Gn-SGSN may decide to apply different MTC throttling factor and throttling delay values at any point in time.

When dropping a DL IP packets, the Gn-SGSN may send in the UL data flow of the PDP context an ICMP packet (e.g. ICMP "destination un-reachable") that should tell the source of the DL IP packet having ben dropped that there is no use in repeating the packet.

The Gn-SGSN can know, when setting up the PDP context, whether the PDP context is for MTC traffic or not.

As indicated above, embodiments of the present invention are not limited to MTC.

For example, more generally, the MME/S4-SGSN may signal during the setup of a PDN connection whether this PDN connection (whatever it is used for) is candidate or not for throttling, or the MME/S4-SGSN may signal when activating throttling the highest ARP (Allocation Retention Priority) priority for which DL traffic should be throttled. The SGW would throttle only PDN connections candidate for throttling, or only DL traffic received on bearers with an ARP priority lower than the ARP priority signalled by the MME/S4-SGSN. Specific throttling of DL MTC traffic could then be achieved by only marking MTC PDN connections as candidate for throttling, or by allocating a specific low ARP priority to MTC traffic. This would also allow to throttle certain MTC traffic while maintaining normal operations for some higher priority MTC traffic.

In one aspect, in an embodiment, there is provided a method for overload control in a packet mobile communication system, said method comprising a step of:
  in case of overload, throttling downlink traffic received for mobile terminals in idle mode when this traffic belongs to a mobile terminal or to a mobile terminal connection declared as candidate for throttling.
In an embodiment, said method comprises a step of:
in case of overload at a Core Network entity, referred to as first entity, interfacing with the Radio Access Network in the control plane, and with a Core Network entity, referred to as second entity, in the control plane, said first entity requesting said second entity to throttle said downlink traffic.
In an embodiment, said method comprises a step of:
said first entity requesting said second entity to throttle said downlink traffic, according to a throttling factor.
In an embodiment, said method comprises a step of:
said first entity requesting said second entity to throttle said downlink traffic, for a throttling delay.
In an embodiment, said method comprises a step of:
upon reception of said request, said second entity dropping downlink packets received for said mobile terminals in idle mode when this traffic belongs to a mobile terminal or to a mobile terminal connection declared as candidate for throttling.
In an embodiment, said method comprises a step of:
said second entity informing a Core Network entity, referred to as third entity, interfacing with said second entity in the user plane, of said dropping.
In an embodiment, said method comprises a step of:
said second entity sending to said third entity an ICMP "destination un-reachable" message.
In an embodiment, said method comprises a step of:
upon reception of said request, said second entity sending Downlink signalling to said first entity for mobile terminals in idle mode, only for mobile terminals or for mobile connections that are not candidate for throttling or for a proportion below a throttling factor of the traffic associated with mobile terminals or with mobile terminal connection declared as candidate for throttling.
In an embodiment, said method comprises a step of:
said first entity signalling to said second entity if a mobile terminal or a mobile terminal connection is candidate for throttling.
In an embodiment, said method comprises a step of:
said first entity signalling to said second entity if a mobile terminal or a mobile terminal connection is candidate for throttling, when setting up a packet connection.
In an embodiment, said method comprises a step of:
a S4-SGSN or MME starting to experience overload requesting a SGW to throttle downlink traffic for mobile terminals in idle mode when this traffic belongs to a mobile terminator to a mobile terminal connection declared as candidate for throttling.
In an embodiment, said method comprises a step of:
a S4-SGSN or MME starting to experience overload requesting a SGW to throttle downlink traffic for mobile terminals in idle mode when this traffic belongs to a mobile terminal or to a mobile terminal connection declared as candidate for throttling, according to a throttling factor specified in the request.
In an embodiment, said method comprises a step of:
a S4-SGSN or MME starting to experience overload requesting a SGW to throttle downlink traffic for terminals in idle mode when this traffic belongs to a mobile terminal or to a mobile terminal connection declared as candidate for throttling, for a throttling delay specified in the request.
In an embodiment, said method comprises a step of:
a S4-SGSN or MME starting to experience overload requesting a SGW to throttle downlink traffic for terminals in idle mode and when this traffic belongs to a mobile terminal or to a mobile terminal connection declared as candidate for throttling, within a Downlink Data Notification Acknowledge message.
In an embodiment, said method comprises a step of:
upon reception from a S4-SGSN or MME of a request to throttle downlink traffic for mobile terminals in idle mode when this traffic belongs to a mobile terminal or to a mobile terminal connection declared as candidate for throttling, a SGW dropping Downlink packets received for said mobile terminals or bearers.
In an embodiment, said method comprises a step of:
SGW informing the source of the DL IP packet that has been dropped of said dropping.
In an embodiment, said method comprises a step of:
SGW informing the source of the DL IP packet that has been dropped of said dropping via an ICMP "destination un-reachable" message sent UL via the PGW.
In an embodiment, said method comprises a step of:
upon reception from a S4-SGSN or MME of a request to throttle downlink traffic for a mobile terminal in idle mode when this traffic belongs to a mobile terminal or to a mobile terminal connection declared as candidate for throttling, a SGW sending a Downlink Data Notification message to the S4-SGSN/MME only for non throttled Downlink packets.
In an embodiment, said method comprises a step of:
upon reception from a S4-SGSN or MME of a request to throttle downlink traffic for mobile terminals in idle mode when this traffic belongs to a mobile terminal or to a mobile terminal connection declared as candidate for throttling, including a throttling delay, a SGW resuming normal operation at the expiry of the throttling delay.

In an embodiment, said method comprises a step of:
a MME/S4-SGSN signalling to a SGW whether a PDN connection is setup for a mobile terminal or for a mobile terminal connection candidate for throttling.

In an embodiment, said method comprises a step of:
in case of overload at a Core Network entity, referred to as fourth entity, interfacing with the Radio Access Network in the control plane and with a Core Network entity referred to as fifth entity in the user plane, said fourth entity throttling said downlink traffic when this traffic belongs to a mobile terminal or to a mobile terminal connection declared as candidate for throttling.

In an embodiment, said method comprises a step of:
said fourth entity throttling said downlink traffic, according to a throttling factor.

In an embodiment, said method comprises a step of:
said fourth entity throttling said downlink traffic, for a throttling delay.

In an embodiment, said method comprises a step of:
said fourth entity sending Downlink signalling for mobile terminals in idle mode, only if said mobile terminals or mobile terminal connections are not candidate for throttling or for a proportion below a throttling factor of the traffic associated with mobile terminals or with mobile terminal connection declared as candidate for throttling.

In an embodiment, said method comprises a step of:
said fourth entity informing said fifth entity, of said dropping.

In an embodiment, said method comprises a step of:
said fourth entity sending to said fifth entity an ICMP "destination un-reachable" message.

In an embodiment, said method comprises a step of:
a Gn-SGSN starting to experience overload throttling downlink traffic for terminals in idle mode when this traffic belongs to a mobile terminal or to a mobile terminal connection declared as candidate for throttling.

In an embodiment, said method comprises a step of:
a Gn-SGSN starting to experience overload throttling said downlink traffic, according to a throttling factor.

In an embodiment, said method comprises a step of:
a Gn-SGSN starting to experience overload throttling said downlink traffic, for a throttling delay.

In an embodiment, said method comprises a step of:
a Gn-SGSN starting to experience overload dropping Downlink packets received for mobile terminals in idle mode when said traffic belongs to a mobile terminal or to a mobile terminal connection declared as candidate for throttling.

In an embodiment, said method comprises a step of:
Gn-SGSN informing the source of the DL IP packet that has been dropped of said dropping.

In an embodiment, said method comprises a step of:
Gn-SGSN informing the source of the DL IP packet that has been dropped of said dropping via an ICMP "destination un-reachable" message sent UL via the GGSN.

In an embodiment, said method comprises a step of:
a Gn-SGSN starting to experience overload sending Downlink signalling for mobile terminals in idle mode, only for mobile terminals or for mobile terminal connections that are not candidate for throttling or for a proportion below a throttling factor of the traffic associated with mobile terminals or with mobile terminal connection declared as candidate for throttling.

In an embodiment, mobile terminals candidate for throttling include Machine Type Communication MTC devices.

In an embodiment, mobile terminals candidate for throttling include mobile terminals having a low priority level for allocation of resources.

In an embodiment, said priority level is given by QoS parameter Allocation Retention Priority ARP.

In other aspects, there are provided entities such as in particular Core Network entities of a mobile communication system, configured to carry out such method, such as in particular MME/S4-SGSN and SGW for EPS, or SGSN and GGSN for GPRS/UMTS.

The detailed implementation of the above-mentioned entities does not raise any special problem for a person skilled in the art, and therefore does not need to be more fully disclosed, for a person skilled in the art.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. A method for overload control in a packet mobile communication system, said method comprising:
at a mobility management entity, receiving from serving gateways downlink signaling traffic for user equipments in idle mode; and
in case of overload of said mobility management entity, requesting said serving gateways to throttle said downlink signaling traffic according to a throttling factor and for a throttling delay specified in the request.

2. The method according to claim 1, further comprising:
the mobility management entity, requesting the serving gateways to throttle the downlink signaling traffic within a downlink data notification acknowledge message.

3. The method according to claim 2, wherein said traffic is associated with low priority traffic.

4. The method according to claim 2, wherein said traffic is associated with traffic having a low allocation retention priority allocated.

5. The method according to claim 1, wherein said traffic is associated with low priority traffic.

6. The method according to claim 1, wherein said traffic is associated with traffic having a low allocation retention priority allocated.

7. The method according to claim 1, wherein the mobility management entity requests the serving gateways to throttle the downlink signaling traffic after its load exceeds a threshold indicating the mobility management entity is starting to experience an overload.

8. The method according to claim 1, wherein said traffic is associated with traffic for machine type communication devices.

9. A method for overload control in a packet mobile communication system, comprising:

at a serving gateway, sending to a mobility management entity downlink signaling traffic for user equipments in idle mode; and receiving a request from the mobility management entity to throttle said downlink signaling traffic according to a throttling factor and for a throttling delay specified in the request.

10. The method according to claim 9, further comprising:
at the serving gateway, dropping received downlink packets associated with said traffic in proportion to the throttling factor during the throttling delay after receiving the request.

11. The method according to claim 9, further comprising:
at the serving gateway, sending a downlink data notification message to the mobility management entity only for non throttled downlink packets after receiving the request.

12. The method according to claim 9, further comprising:
at the serving gateway, resuming normal operation without throttling downlink signaling traffic after expiry of the throttling delay.

13. The method according to claim 9, wherein last received values for the throttling factor and throttling delay from the mobility management entity supersede previous received values for the throttling factor and throttling delay from the mobility management entity.

14. The method according to claim 9, further comprising:
at the serving gateway, restarting a timer associated with the mobility management entity after receiving the throttling delay.

15. The method according to claim 9, wherein the request is received by the serving gateway within a downlink data notification acknowledgement message.

16. The method according to claim 9, wherein said traffic is associated with traffic for machine type communication devices.

17. An apparatus, comprising:
at least one processor; and
at least one memory including computer program code;
the at least one memory and the computer program code configured to, with the at least one processor, cause the apparatus at least to perform:
receive from serving gateways downlink signaling traffic for user equipments in an idle mode and,
in case of overload of said apparatus, request said serving gateways to throttle said downlink signaling traffic according to a throttling factor and for a throttling delay specified in the request.

18. The apparatus according to claim 17, wherein the at least one memory and the computer program code are configured to, with the at least one processor, cause the apparatus at least to perform: request the serving gateways to throttle the downlink signaling traffic within a downlink data notification acknowledgement message.

19. The apparatus according to claim 17, wherein said traffic is associated with low priority traffic.

20. The apparatus according to claim 17, wherein said traffic is associated with traffic having a low allocation retention priority allocated.

21. The apparatus according to claim 17, wherein the at least one memory and the computer program code are configured to, with the at least one processor, cause the apparatus at least to perform: request the serving gateways to throttle the downlink signaling traffic after its load exceeds a threshold indicating the mobility management entity is starting to experience an overload.

22. An apparatus, comprising:
at least one processor; and
at least one memory including computer program code;
the at least one memory and the computer program code configured to, with the at least one processor, cause the apparatus at least to perform:
send to a mobility management entity downlink signaling traffic for user equipments in idle mode and
receive a request from said mobility management entity to throttle said downlink signaling traffic according to a throttling factor and for a throttling delay specified in the request.

23. The apparatus according to claim 22, wherein the at least one memory and the computer program code are configured to, with the at least one processor, cause the apparatus at least to perform: drop received downlink packets associated with said traffic in proportion to the throttling factor during the throttling delay after receiving the request.

24. The apparatus according to claim 22, wherein the at least one memory and the computer program code are configured to, with the at least one processor, cause the apparatus at least to perform: send a downlink data notification message to the mobility management entity only for non throttled downlink packets after receiving the request.

25. The apparatus according to claim 22, wherein the at least one memory and the computer program code are configured to, with the at least one processor, cause the apparatus at least to perform: resume normal operation without throttling downlink signaling traffic, after expiry of the throttling delay.

26. The apparatus according to claim 22, wherein last received values for the throttling factor and throttling delay from the mobility management entity supersede previous received values for the throttling factor and throttling delay from the mobility management entity.

27. The apparatus according to claim 22, wherein the at least one memory and the computer program code are configured to, with the at least one processor, cause the apparatus at least to perform: restart a timer associated with the mobility management entity after receiving the throttling delay.

28. The apparatus according to claim 22, wherein said traffic is associated with low priority traffic.

29. The apparatus according to claim 22, wherein said traffic is associated with traffic having a low allocation retention priority allocated.

30. The apparatus according to claim 22, wherein the at least one memory and the computer program code are configured to, with the at least one processor, cause the apparatus at least to perform: receive the request within a downlink data notification acknowledgement message.

31. The apparatus according to claim 22, wherein said traffic is associated with traffic for machine type communication devices.

32. A method for overload control in a packet mobile communication system, said method comprising:
at a serving GPRS support node, receiving from serving gateways downlink signaling traffic for user equipments in idle mode; and
in case of overload of the serving GPRS support node, requesting the serving gateways to throttle said downlink signaling traffic according to a throttling factor and for a throttling delay specified in the request.

33. A method for overload control in a packet mobile communication system, comprising:
at a serving gateway, sending to a serving GPRS support node downlink signaling traffic for user equipments in an idle mode; and receiving a request from the serving GPRS support node to throttle said downlink signaling traffic according to a throttling factor and for a throttling delay specified in the request.

34. An apparatus, comprising:
at least one processor; and
at least one memory including computer program code;
the at least one memory and the computer program code configured to, with the at least one processor, cause the apparatus at least to perform:
send to a serving GPRS support node downlink signaling traffic for user equipments in an idle mode and,
receive a request from said serving GPRS support node to throttle said downlink signaling traffic according to a throttling factor and for a throttling delay specified in the request.

\* \* \* \* \*